H. H. RAY.

Improvement in Tempering Apparatus.

No. 4,829. Reissued March 26, 1872.

Witnesses.
F. A. Connolly
E. A. Bates

Inventor.
H. H. Ray
Chipman Hosmer & Co
Attys

UNITED STATES PATENT OFFICE.

HENRY H. RAY, OF ARENA, WISCONSIN.

IMPROVEMENT IN TEMPERING APPARATUS.

Specification forming part of Letters Patent No. 119,406, dated September 26, 1871; antedated September 23, 1871; reissue No. 4,829, dated March 26, 1872.

*To all whom it may concern:*

Be it known that I, HENRY H. RAY, of Arena, in the county of Iowa and State of Wisconsin, have invented a new and Improved Apparatus for Bending and Tempering the Mold-Boards of Plows; and I do hereby declare that the following is a full, clear, and exact description thereof, reference being had to the accompanying drawing and to the letters of reference marked thereon.

Figure 1:
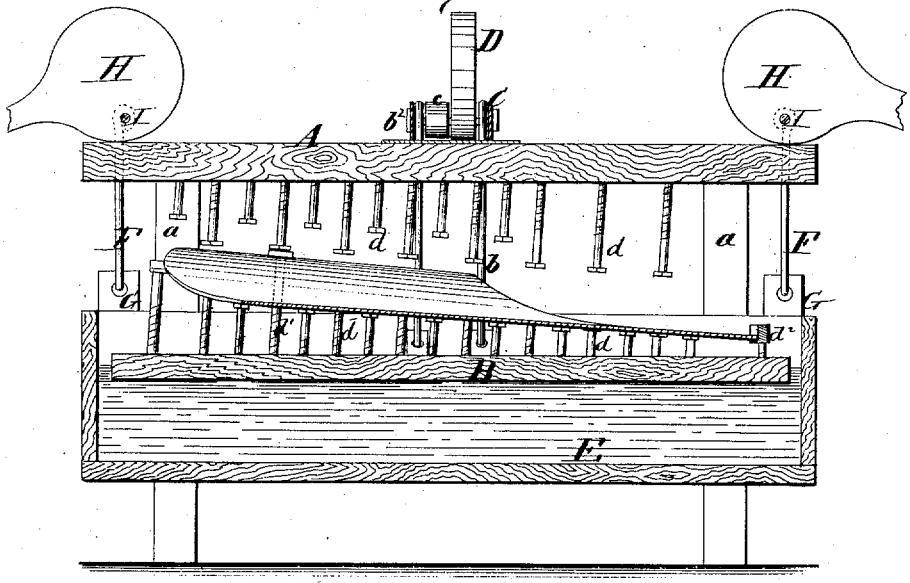
Figure 2:
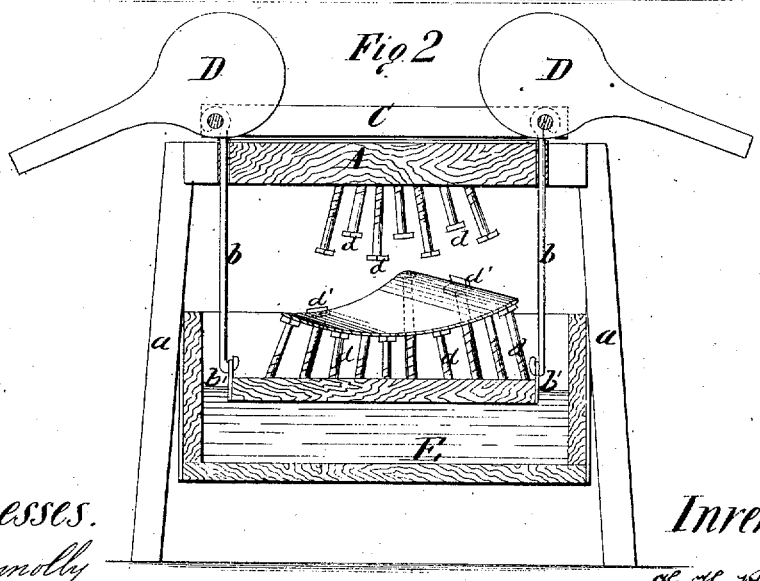

In the drawing, Figure 1 is a representation of a vertical longitudinal section of my invention. Fig. 2 is a vertical transverse section of the same.

My invention has relation to the means for bending and tempering the mold-boards of plows; and the novelty consists in the construction and arrangement of a set of dies, and operating devices appertaining thereto, by means of which the proper curvature is given to the heated mold-board plate. My invention also consists in the combination, with an apparatus for shaping the mold-boards of plows, of a water-trough, and means for raising and lowering the same, so arranged that while the mold-board is in the press and still hot the water may be readily thrown on and off so as to cool and temper it.

In the accompanying drawing, illustrating this invention, A represents the upper press-table or die-plate, supported by posts *a*. B designates the lower die-plate, which is suspended by rods *b*, attached to ears $b^1$, on opposite sides and near the middle part of the plate B. The rods *b* pass up at the sides of the table A, and are attached to horizontal rods or bolts $b^2$. These bolts are secured to the ends of transverse bars C, above the plate A, and have pivoted to them the eccentric levers D, designed for the purpose of raising and lowering the die-plate B. The plate B is raised by turning the levers D toward each other, said levers being so arranged upon the bolts $b^2$ as to pass each other in their operating movement. To keep said levers so arranged, blocks or washers *c* may be placed on the bolts $b^2$. The shaping of the heated mold-board plate is accomplished by means of heated screws *d* inserted in the plates A B to such extent, respectively, that, taken together, they form a set of dies. The shape of the dies may be varied, when desired, by changing the positions of the screws so that they may project, more or less, according to the form that is to be given to the mold-board. For greater strength and security, the screws *d* should stand radially, or nearly so, to the sphere of which the mold-board shall represent, or approximately represent, a segment. At proper points on the plate B flanged screws $d^1$ $d^2$ are arranged, so as to hold the mold-board plate in place by supporting its edges. The screw $d^2$ holds the point of the mold-board, and has a V-shaped recess formed in it to correspond to the bevel of the mold-board. The levers D are adapted to raise the lower die by turning the cams inwardly or toward each other, so as to render them more convenient and the work of pressing easier.

By this arrangement of the levers one man may operate them both, and is enabled to exert the greatest force when most required, as when the curvature of the mold-board is being completed, at which time the levers will have crossed each other.

E designates a trough, designed to contain water, for the purpose of submerging the heated and shaped mold-board in order to temper it. This trough lies underneath the plate B, and is suspended by means of corner-rods F, attached to metal straps G. The rods F are connected to eccentric levers H, which are turned inwardly to raise, and outwardly to lower, the tempering-trough. Each pair of the levers are connected by a transverse bar, I.

When the mold-board is formed, and while it is still hot, the trough is raised so as to submerge the former in the water and thereby temper it.

The screws $d^1$ $d^2$ prevent the mold-board from warping while being tempered. The screws *d* are constructed with broad heads, so that when brought into contact with the heated metal they shall not be so liable to indent it as if otherwise formed.

What I claim as my invention, and desire to secure by Letters Patent, is—

1. The combination, with a machine for bending heated metal plates, of the tempering-trough E, rods F, and eccentric levers H, substantially as specified.

2. In a machine for bending and tempering the mold-boards of plows or other metal plates, the flanged screws $d^1$ $d^2$, substantially as and for the purpose specified.

3. The combination, with the die-plates A B and rods *b*, of the cam-levers D, so arranged that by turning them toward each other the dies shall approach together, as and for the purpose specified.

In testimony that I claim the above I have hereunto subscribed my name in the presence of two witnesses.

HENRY H. RAY.

Attest:
G. C. MEIGS,
DAVID W. INMAN.